United States Patent
Qiao et al.

(10) Patent No.: US 10,012,170 B2
(45) Date of Patent: Jul. 3, 2018

(54) METHOD, SYSTEM AND APPARATUS FOR DETECTING INJECTOR CLOSING TIME

(71) Applicant: Continental Automotive Systems, Inc., Auburn Hills, MI (US)

(72) Inventors: Ningsheng Qiao, Troy, MI (US); Donald P Kultgen, Livonia, MI (US); Pascal Barbier, Tournefeuille (FR)

(73) Assignee: Continental Automotive Systems, Inc., Auburn Hills, MI (US)

( * ) Notice: Subject to any disclaimer, the term of this patent is extended or adjusted under 35 U.S.C. 154(b) by 334 days.

(21) Appl. No.: 14/689,367

(22) Filed: Apr. 17, 2015

(65) Prior Publication Data

US 2016/0305360 A1   Oct. 20, 2016

(51) Int. Cl.
*F02D 41/24* (2006.01)
*F01N 3/20* (2006.01)
(Continued)

(52) U.S. Cl.
CPC ......... *F02D 41/2467* (2013.01); *F01N 3/208* (2013.01); *F02D 41/221* (2013.01);
(Continued)

(58) Field of Classification Search
CPC .... F02D 41/40; F02D 41/2467; F02D 41/221; F02D 2041/2055; F02D 2041/2058;
(Continued)

(56) References Cited

U.S. PATENT DOCUMENTS

| 5,535,621 A | 7/1996 | Glidewell et al. |
| 9,316,478 B2 | 4/2016 | Wirkowski et al. |

(Continued)

FOREIGN PATENT DOCUMENTS

| EP | 2469064 A1 | 12/2012 |
| JP | 2014177883 A | 9/2014 |
| KR | 1020130138757 | 12/2013 |

OTHER PUBLICATIONS

Wayback Machine Snapshot, ATS EScope Training Automotive Test Solutions Injectors 1, Oct. 25, 2014.*

(Continued)

*Primary Examiner* — Manish S Shah
*Assistant Examiner* — Timothy Graves

(57) ABSTRACT

A method for detecting a closing time of an injector valve includes receiving a valve current profile of the injector valve, processing the valve current profile using at least a slope discriminator, determining a stuck status and a closing time (if applicable) of the injector valve based on an output of the slope discriminator. An engine control unit configured to detect a closing time of an injector valve is also provided. The engine control unit has a first control logic configured to receive a valve current profile of the injector valve, a second control logic configured to process the current profile using at least a slope discriminator, and a third control logic configured to determine a stuck status and a closing time of the injector valve based on an output of the slope discriminator. Further, a vehicle system including a controller configured to detecting a valve closing time is provided.

7 Claims, 4 Drawing Sheets

(51) Int. Cl.
*F02D 41/22* (2006.01)
*F02D 41/20* (2006.01)
*F02D 41/28* (2006.01)

(52) U.S. Cl.
CPC  *F01N 2610/146* (2013.01); *F02D 2041/2055* (2013.01); *F02D 2041/2058* (2013.01); *F02D 2041/286* (2013.01); *Y02T 10/24* (2013.01); *Y02T 10/40* (2013.01)

(58) Field of Classification Search
CPC ............... F02D 2041/286; F01N 3/208; F01N 2610/146; Y02T 10/24; Y02T 10/40
USPC ....................................................... 73/114.49
See application file for complete search history.

(56) References Cited

U.S. PATENT DOCUMENTS

| | | | | |
|---|---|---|---|---|
| 2005/0066940 A1* | 3/2005 | Sheikh | ................... | F02D 41/20 123/446 |
| 2012/0116702 A1* | 5/2012 | Beer | ....................... | F02D 41/20 702/65 |
| 2012/0296551 A1* | 11/2012 | Kabasin | ................ | F02D 19/024 701/103 |
| 2012/0296553 A1* | 11/2012 | Bagnasco | ............ | F02D 41/008 701/103 |
| 2013/0180323 A1 | 7/2013 | Peucat et al. | | |
| 2013/0226488 A1 | 8/2013 | Wirkowski et al. | | |
| 2014/0069533 A1* | 3/2014 | Gorzen | ............... | F02D 41/2467 137/554 |
| 2015/0113950 A1* | 4/2015 | Qiao | ....................... | F01N 11/00 60/274 |

OTHER PUBLICATIONS

Preliminary Search Report from France Patent Office for counterpart France patent application 16 00655, dated Mar. 13, 2018.

* cited by examiner

METHOD, SYSTEM AND APPARATUS FOR DETECTING INJECTOR CLOSING TIME

TECHNICAL FIELD

The present disclosure relates generally to injector controls, and more specifically to a process, system, and apparatus for detecting a closing time and status of a solenoid injector.

BACKGROUND OF THE INVENTION

The global drive to reduce NOx and CO2 emissions from diesel engine exhausts has led to the implementation of selective catalytic reduction systems in diesel engine vehicles to reduce the automotive emissions. Selective catalytic reduction systems operate by adding a gaseous or liquid reductant to the exhaust gas stream from an engine. The gaseous or liquid reductant is absorbed onto a catalyst where the reductant reacts with nitrogen oxides in the exhaust gas to form water vapor and nitrogen.

This treatment requires the reducing agent to be administered at a precise concentration and with high quality. The solution must be accurately metered and injected into the exhaust gas stream, where it is hydrolyzed before converting the nitrogen oxide (NOx) to nitrogen (N2) and water (H2O).

As the tailpipe NOx emission standard becomes increasingly stringent, it is desired to diagnose the injection faults to assist with the SCR DeNOx functionality and performance. For example, a stuck injector may cause underdosing of urea and thus reduced DeNOx functionality.

In order to properly interact with on-board diagnostic systems, such as OBD or OBDII, existing selective catalytic reduction systems include self-diagnostics to identify faults and enable pin point replacement while the vehicle is being serviced. For example, pressure changes may be monitored after commanding the pump to run or shut down. One drawback of this method, however, is that the emissions control process is disrupted. Accordingly, new systems and methods of detecting the SCR closing time are desired.

In addition, determining closing time of injectors for direct fuel injection is also desired, in order to provide for better control and improved fuel economy.

SUMMARY OF THE INVENTION

Disclosed is an apparatus, system, and method for detecting a closing time of a valve, such as an SCR valve or a direct injection valve, without additional hardware and without disrupting the emissions control process. The invention may include employing a digital filter and a slope discriminator is developed, which enables a diagnostic function to accurately detect injector closing time and reliably identify a stuck closing injector by monitoring injector current on an injection-to-injection basis.

In one form, a method for detecting a closing time of an injector valve is provided. The method includes receiving a valve current profile of the injector valve, processing the valve current profile using at least a slope discriminator, determining a stuck status of the injector valve based on an output of the slope discriminator, and if the injector valve is not stuck, determining the closing time of the injector valve based on the output of the slope discriminator.

In another form, an engine control unit configured to detect a closing time of an injector valve is provided. The engine control unit includes a first control logic configured to receive a valve current profile of the injector valve, a second control logic configured to process the valve current profile using at least a slope discriminator, and a third control logic configured to determine a stuck status and a closing time of the injector valve based on an output of the slope discriminator.

In yet another form, a vehicle system is provided that includes an exhaust system including an injector and at least one sensor operable to detect a current draw of the injector. The vehicle system also includes a controller connected to the at least one sensor. The controller is operable to receive a profile of the current draw of the selective catalytic reduction injector and to process the profile using a slope discriminator. The controller is also operable to determine a stuck status and a closing time of the injector based on an output of the slope discriminator.

In still another form, the present disclosure provides a non-transitory machine-readable medium that provides instructions, which when executed by a machine, cause the machine to perform operations. The operations include receiving a valve current profile of the injector valve, processing the valve current profile using at least a slope discriminator, and determining a stuck status and a closing time of the injector valve based on an output of the slope discriminator.

In still another form, a method for controlling an injector is provided. The includes the steps of: instructing an injector to begin closing using a controller; receiving an injector current profile of the injector at the controller; processing the current profile using at least a slope discriminator in the controller; and determining stuck status and a closing of the injector based on an output of the slope discriminator.

These and other features of the present invention can be best understood from the following specification and drawings, the following of which is a brief description.

BRIEF DESCRIPTION OF THE DRAWINGS

The following figures are provided for illustration purposes only, and are not intended to limit the scope of the present application and claims:

DETAILED DESCRIPTION

Figure 1:
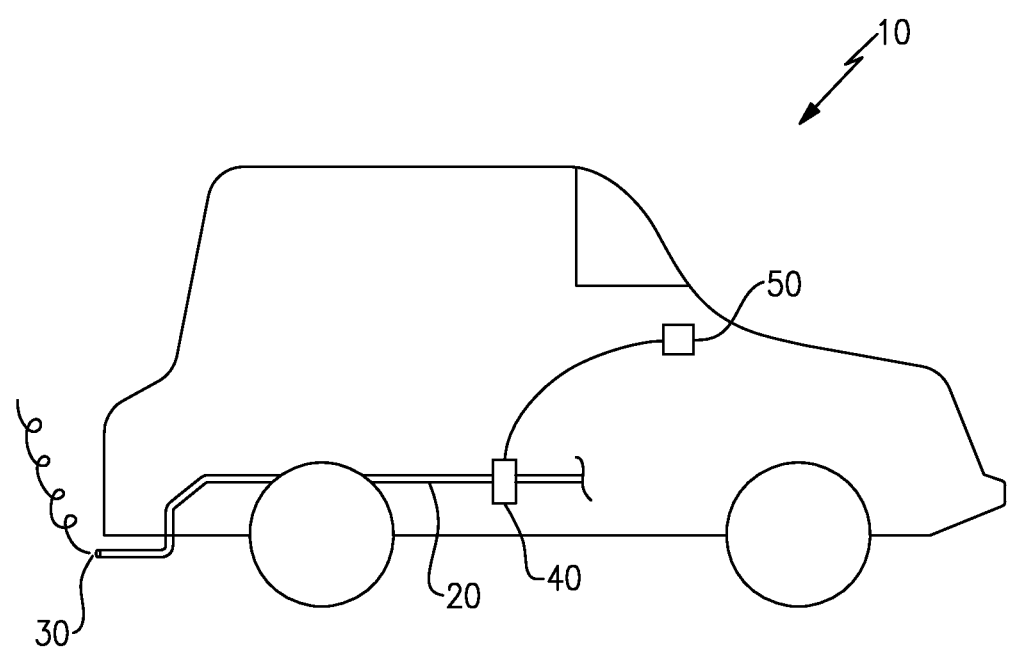
FIG. 1 is a schematic side view of a vehicle including a selective catalytic reduction injector for reducing emissions, in accordance with the principles of the present disclosure.

FIG. 1 schematically illustrates a vehicle 10 including an exhaust system 20 for expelling exhaust 30 from an internal combustion engine of the vehicle 10. The exhaust system 20 includes a selective catalytic reduction injector 40 that adds a gaseous or liquid reductant to the exhaust gas stream from the engine. The gaseous or liquid reductant is absorbed onto a catalyst where the reductant reacts with nitrogen oxides in the exhaust gas to form water vapor and nitrogen. The selective catalytic reduction injector 40 is controlled by a controller 50, and includes a sensor package capable of sensing inputs to and outputs from the selective catalytic reduction injector 40. In one example, the injector 40 is in the form of a solenoid valve.

One of the inputs that the sensor package can detect, and communicate back to the controller 50, is a current draw of the selective catalytic injector 40. This current draw can be aggregated by the controller 50 to determine a current profile of the selective catalytic reduction injector 40. Based on the current profile of the selective catalytic reduction injector 40, the controller 50 can determine a precise injector closing time and whether the injector is stuck or unstuck using the below described process.

The current profile of the selective catalytic reduction injector 40 is a function of battery voltage supplied to the injector, injector temperature and injector fluid pressure. At the conditions of low temperature, low pressure, and high voltage, the current profile of a nominal selective catalytic reduction injector 40 is almost the same as (superficially similar to) a stuck selective catalytic reduction injector, and a top level, or visual, inspection of the current profile is insufficient to identify a stuck injector or to precisely identify the closing time of the injector 40.

Though an SCR injector 40 is shown in FIG. 1, it should be understood that any type of solenoid injector could be used, such as a solenoid port fuel injector or a solenoid direct fuel injector. Solenoid fuel injectors also have a current draw, from which a current profile can be aggregated by a controller, such as controller 50. Accordingly, the principles described here may apply to a solenoid fuel injector, as well as an SCR injector 40, or any injector with an inductance reaction upon opening or closing.

Figure 2A:
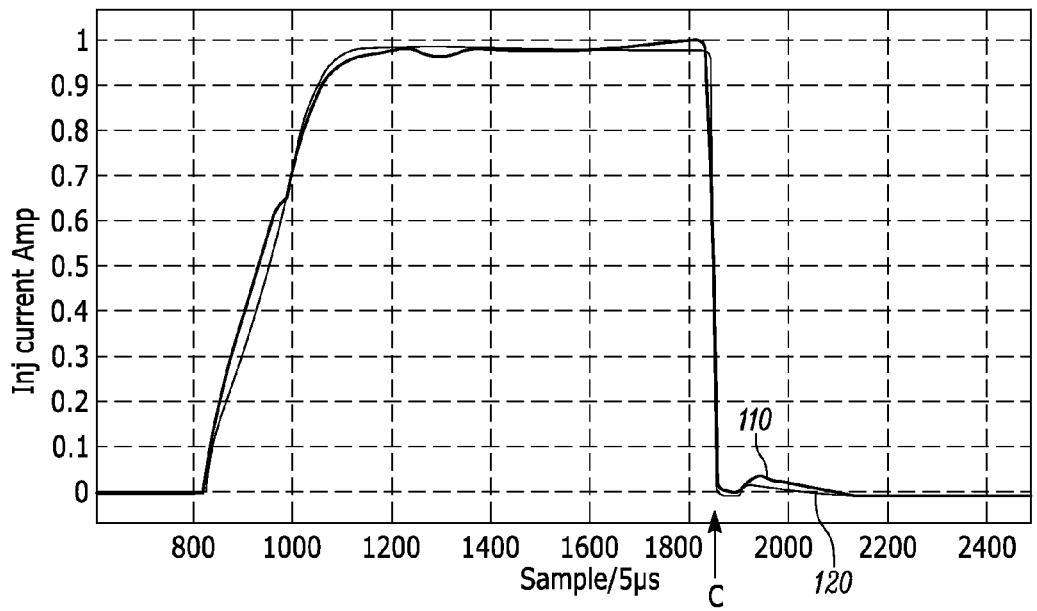
FIG. 2A is a graph of a current profile of a selective catalytic reduction injector and a current profile of a stuck selective catalytic reduction injector with respect to time, according to the principles of the present disclosure.
Figure 2B:
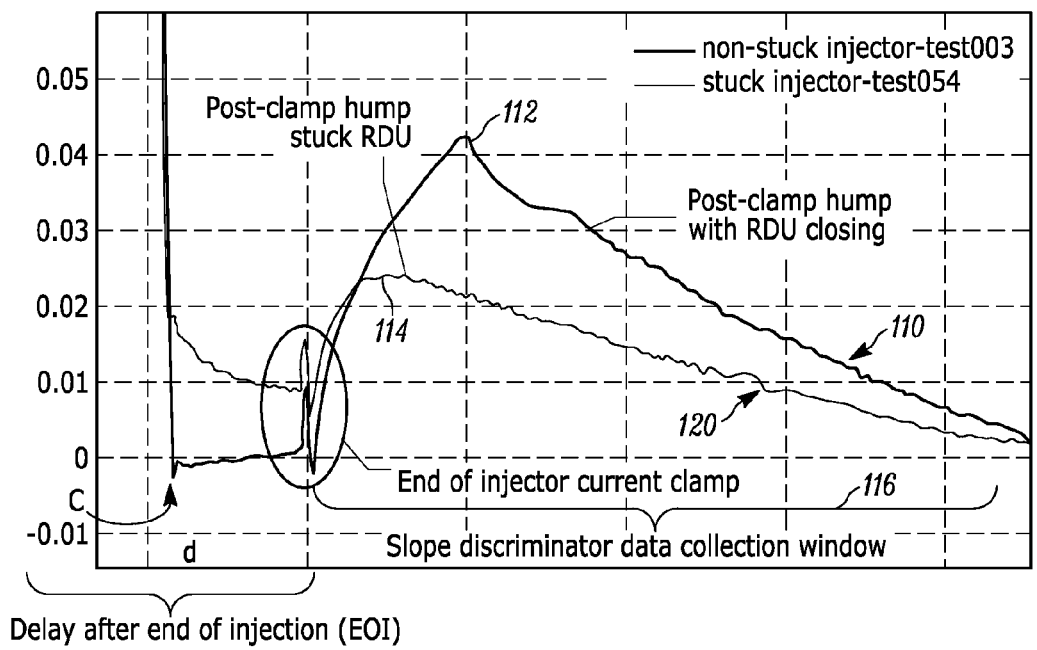
FIG. 2B is a zoomed-in portion of the graph of FIG. 2A, illustrating a current profile of a selective catalytic reduction injector and a stuck selective catalytic reduction injector at and around closing time, in accordance with the principles of the present disclosure.

With continued reference to FIG. 1, FIGS. 2A-2B illustrate a current profile 110 of a selective catalytic reduction injector 40 and a current profile 120 of a stuck selective catalytic reduction injector 40 with respect to time. FIG. 2B is an enlarged view of the end of injection. When the injector 40 is desired to be closed, the current is clamped and the injector begins to close at a time period c. After a delay period d, the non-stuck injector 40 has a post-clamp hump 112 in its current profile 110, and the stuck injector 40 has a post-clamp hump 114 in its current profile 120. The post-clamp hump 112 of the non-stuck injector is larger than the post-clamp hump 114 of the stuck injector, that is, the injector that does not fully close. The delay period d is a calibration value. The purpose of delay is to reduce the length of injector current data buffer, and avoid injector current clamp.

A data collection window of a current profile 110, 120 is the window during which the analog-to-digital converter (ADC) of controller 50 collects injector current profile data for detecting the current drawn by the injector 40. The ADC of controller 50 can be configured to read and filter injector closing data with a high sampling rate. During this window 116, the injector closing current data is processed by the ADC of controller 50 and stored in a data buffer. The data in the buffer can be fed to a slope discriminator to determine the selective catalytic reduction injector 40 stuck status and closing time. The slope discriminator can be another controller, a software module stored in a memory of the controller 50, or any other similar system. For example, the controller 50 can be configured to receive the valve current profile 110, 120, process the valve current profile with the slope discriminator, and determine the stuck status and the closing time (if applicable) of the injector valve based on the output of the slope discriminator.

Figure 3:
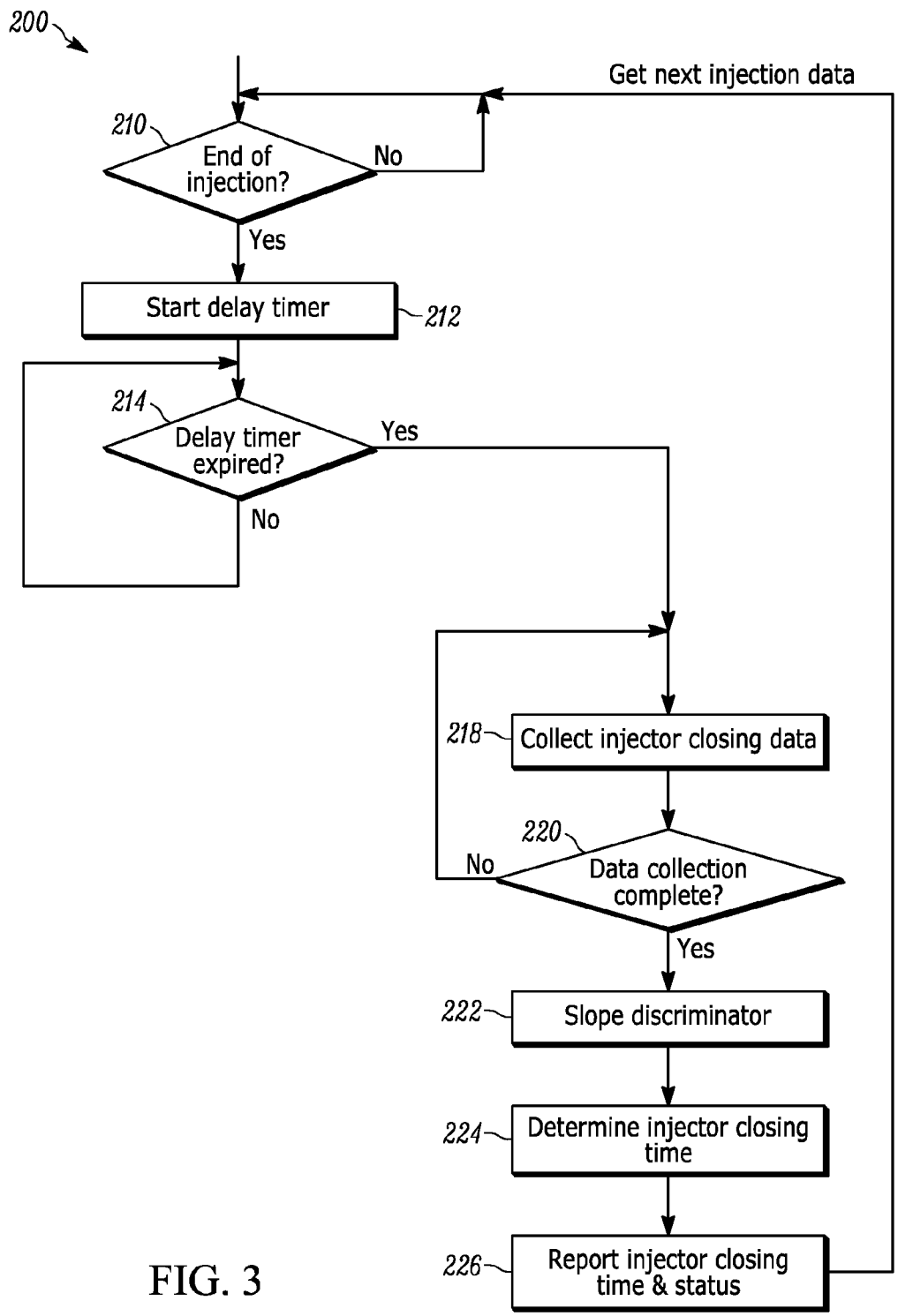
FIG. 3 is a block diagram illustrating a process for detecting a closing time and status of an injector, according to the principles of the present disclosure.

With continued reference to FIG. 1, FIG. 3 illustrates a process 200 utilized by the controller 50 to detect the stuck status and closing time of the selective catalytic reduction injector 40. As described above, the process 200 may alternatively apply to a solenoid fuel injector, rather than an SCR injector 40. Initially, the controller 50 checks to see if injection has ended in an end of injection check step 210. If injection has not ended, the process 200 loops back, and the end of injection check step 210 is performed again after any suitable delay.

If injection has ended, the process 200 starts a delay timer in step 212. The delay timer step 212 causes delay for a predetermined, calibrated period of time. As illustrated in FIG. 2B, there is a delay period d between when the injection ends and when the detection window 116 opens. In the step 212, the controller 50 waits the delay period between the end of injection and the beginning of the detection window 116 before moving on to detect the stuck status and closing time.

Next, the process 200 moves to a check step 214 of whether the delay timer has expired. If the delay timer has not expired when the controller 50 performs the delay timer expired check 214, the process 200 loops back to wait for the delay timer to expire and checks again at step 214. The delay timer is updated every time when the function is executed.

If, however, the delay timer has expired, the controller 50 begins collecting and filtering current data to construct an injector closing current profile of the injector 40 in a collect injector closing data step 218. The current data can be processed using any acceptable sensor arrangement. In some examples, the current data is collected using an extremely high sampling rate. The sampling rate is the rate at which data samples are detected. By way of example, a sampling rate of 1 microsecond corresponds to one current detection occurring every microsecond, and this sampling rate may be used in the current application.

After the collect injector closing data step 218, the process moves to a check step 220 to determine whether data collection is complete. If data collection is not complete, the process 200 loops back around to the collect injector closing data step 218, in the collection window 116. After it is determined in step 220 that data collection is complete, the process 200 moves to step 222.

In order to reduce the detected current data to a manageable condition and amount, the detected data may be filtered by the controller 50 to remove high frequency noise using a standard digital filter. In example utilizing a high sampling rate, the data may be further downsampled using known downsampling techniques to reduce the amount of data in the current profile. The filtered and downsampled data forms an injector closing current profile, such as the current profiles 110, 120 illustrated in FIGS. 2A-2B. The processed injector closing current profile data is stored in the injector closing data buffer. Once the current profile has been determined, the controller 50, or another device, applies a slope discriminator process to the current profile in an apply slope discriminator step 222. Because the injector closing current profile data has been stored in the buffer, the steps 222, 224 and 226 can be executed according to systems task scheduling. The process performed by the slope discriminator is described below in greater detail with regards to FIG. 4.

The slope discriminator may utilize nonlinear digital filtering techniques to distinguish the difference in the slope between a stuck injector and a non-stuck injector during closing time. Thus, after the step 222 of applying the slope discriminator, the process 200 moves on to determine the injector closing time (if not stuck) and/or the stuck status of being stuck or not stuck in step 224.

Once the closing time and/or stuck status of the injector 40 has been determined, the controller 50 reports the stuck status and/or the closing time in a report closing time and status step 226. The reporting can be to another separate controller, a subprogram within the controller 50, or a diagnostic system, such as an OBD (On-Board Diagnostic) or OBDII (On-Board Diagnostic II). Alternately, the closing time and status can be reported to any other system where the opening time and status of the injector 40 is needed.

Figure 4:
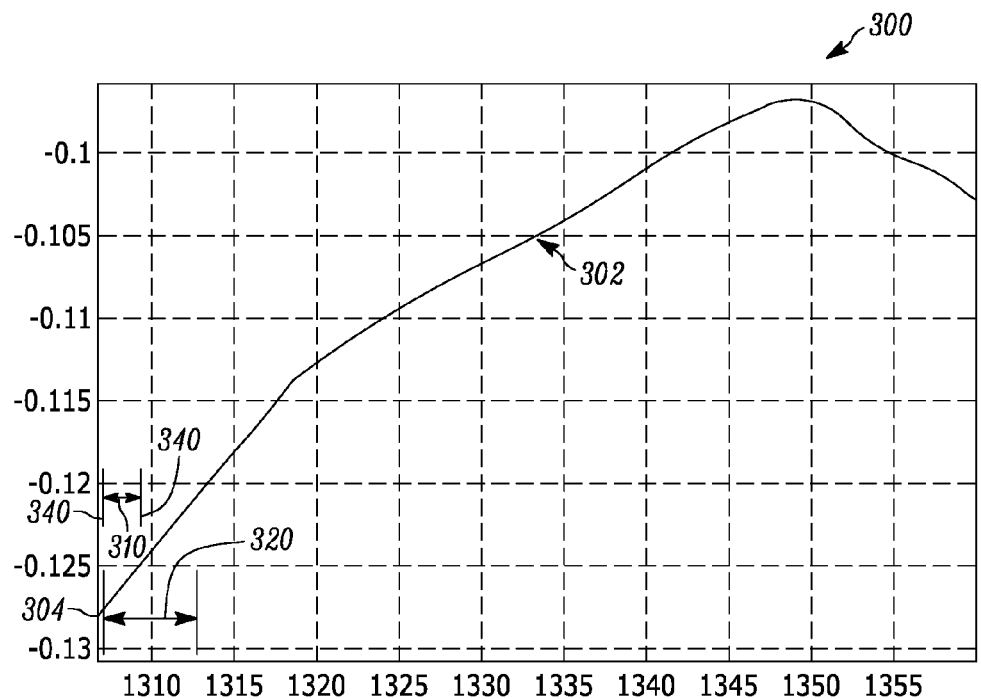
FIG. 4 is a graph illustrating a slope discriminator scheme for the process of FIG. 3, in accordance with the principles of the present disclosure.

With continued reference to FIG. 1, FIG. 4 is a graph 300 illustrating a current profile 302 of an injector 40, which shows the principles of the slope discriminator. As described above, in order to determine the current profile 302, the controller 50 may utilize a nonlinear digital filtering technique to remove noise and downsamples the data to decrease the amount of data, thereby decreasing the data buffer size. Once the current profile 302 has been determined, the controller 50 applies the slope discriminator.

The slope discriminator utilizes a modified median filter to determine a slope of the injector profile 302. The slope discriminator processes the current profile 302 entry by entry, replacing each entry with the centered value of neighboring entries falling within a median window 320 to determine a median current profile. The entries within the median window 320 are then sorted in increasing value. The slope discriminator further processes the current profile 302 entry by entry, replacing each entry with the mean value of neighboring entries falling with a mean window 310 to determine a mean current profile.

As can be seen in FIG. 4, the mean window 310 is a smaller window (encompasses fewer neighboring data points) than the median window 320. Further, the mean window 310 falls entirely within the median window 320. The starting edge of the mean window 310 may be offset from the starting edge of the median window 320 by an offset value. The size of both the mean window 310 and the median window 320, as well as the size of the offset, are calibration values that can be experimentally or mathematically determined for a particular selective catalytic reduction injector 40 by one of skill in the art having the benefit of this disclosure. Due to the required size of the windows 310, 320, the initial output of the slope reflection detection process occurs at point 340, and not at a start time 304 of the current profile 302. In the illustrated example of FIG. 4 the initial output 340 of the slope discriminator occurs at the end point of the initial mean window 310.

The value of the output at point 340, and all output values 302, is determined by the following relationship:

Output=median term*gain factor for median term−
(mean term*gain factor for mean term−offset
term);

where Output is the output value;
median term is the center value of the median window 320, which is calculated in sliding window 320 entry by entry;
mean term is the mean value of the mean window 310, which is calculated in sliding window 310 entry by entry;

gain factor for median term=1+abs(median term−
mean term); and gain factor for mean term=1−abs(median term−mean
term);

offset term=abs(median term−mean term)/length of
median sliding window 320.

As known in mathematics, "abs" is the absolute value function. Thus, the gain factors are variable gain factors, which depend on the difference between the median term and the mean term. The gain factor for the median term is always greater than or equal to one; and the gain factor for the mean term is always less than or equal to one. The offset term is also related to the difference between the mean term and the median term.

As a result of the above relationships, the bigger the difference between the value of the median window 320 and the mean window 310, the greater the factor gain factor for the median term will be. Similarly, the bigger the difference between the value of the median window 320 and the mean window 310, the smaller factor gain factor for the mean term will be. This difference in the gain factors results in an output term that greatly magnifies the slope, thus showing a separation between the stuck injector current profile and the non-stuck injector closing profile at closing time.

Figure 5:
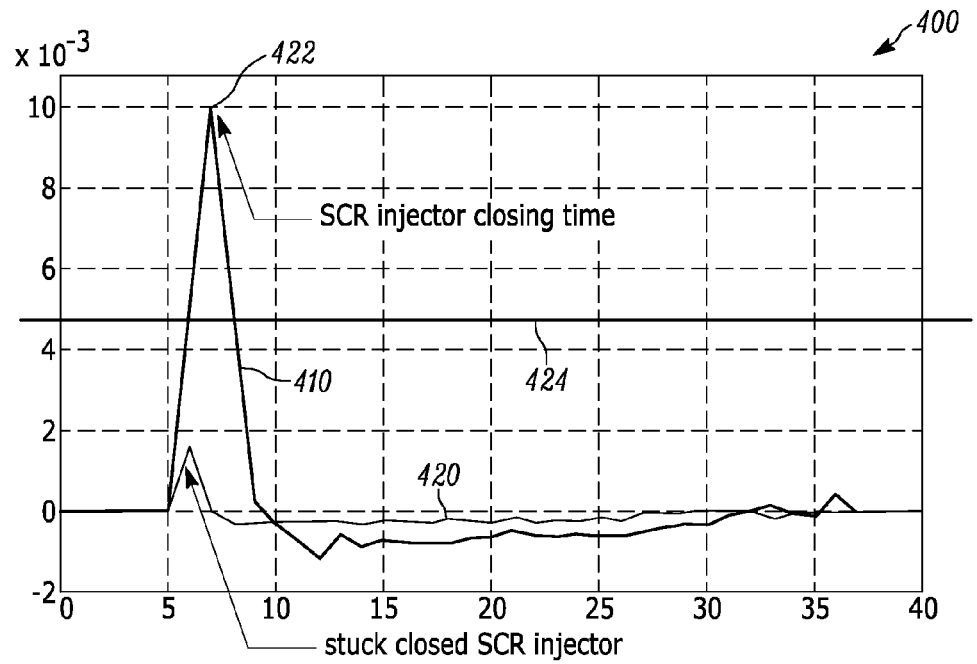
FIG. 5 is a graph illustrating an output chart of a slope discriminator, according to the principles of the present disclosure.

With continued reference to FIGS. 1 and 4, FIG. 5 illustrates an output graph 400 showing outputs of the slope discriminator for non-stuck and stuck SCR injectors 40. The outputs for a normal, non-stuck injector are graphed at line 410, and the outputs for a stuck injector are graphed at line 420. The location of the maximum value 422 of the normal injector output plot 410 indicates that the SCR injection needle is fully closed. Since there is a large separation between the stuck and non-stuck profiles 420, 410, a predetermined calibrated threshold 424 can be determined, to which the profiles 410, 420 can be compared. For example, if any of the profile 410, 420 is above the threshold 424, then the SCR injector can be determined to be non-stuck; and if any of the profile 410, 420 is below the threshold 424, the SCR injector can be determined to be closed. Based on this difference, the controller 50 can detect when the selective catalytic reduction injector 40 is stuck (i.e. when any of the output profile 410, 420 exceeds the predetermined threshold 424).

The precise injector closing time can be easily calculated based on the location of the maximum value 422. The precise closing time of the selective catalytic reduction injector 40 is precise to within a time period of the downsampled data rate. Thus, if the downsampled data rate is 1 microsecond, the time of the maximum value point 422 can fall within 1 microsecond of the actual fully open time of the selective catalytic reduction injector 40, depending on the system tolerances and slope discriminator filter calibration.

By utilizing the above described process, the controller 50 can determine the precise closing time of a selective catalytic reduction injector and whether the selective catalytic reduction injector is stuck or non-stuck. As can be appreciated by one of skill in the art having the benefit of this disclosure, the above described process can be applied to any number of injector valves exhibiting similar slope reflection characteristics, and is not limited to selective catalytic reduction injectors.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for detecting a closing time of an injector valve of a vehicle engine, the method comprising:
receiving, at a first control logic, a valve current profile of the injector valve;
processing, at a second control logic, the valve current profile using at least a slope discriminator;
determining, at the second control logic, an output of the slope discriminator based on the valve current profile; and
determining, at a third control logic, based on the output of the slope discriminator: a stuck status of the injector valve, and a closing time of the injector valve when the injector valve is not stuck, by:
comparing the output of the slope discriminator to a predetermined closing time detection threshold;
determining whether a maximum output value of the slope discriminator is below the predetermined closing detection time detection threshold;
if the maximum output value is below the predetermined closing time detection threshold, determining, by the third control logic, that the stuck status is stuck; and
if the maximum output value is above the predetermined closing time detection threshold:
determining that the stuck status is not stuck, and
determining the closing time of the injector valve based on a location of the maximum output value.

2. The method of claim 1, further comprising starting, at a fourth control logic, a delay timer at an end of an injector current clamp, the method further comprising delaying for a predetermined period of time starting at the end of the injector current clamp prior to the step of receiving the valve current profile of the injector valve, wherein receiving the valve current profile includes collecting valve current data.

3. The method of claim 1, wherein the step of processing the valve current profile comprises determining median values within a median window and mean values within a mean window.

4. The method of claim 3, wherein the step of processing the valve current profile comprises calculating a series of mean output data points and a series of median output data points,
wherein each median output data point in the median window is a median value of data points within the median window at a corresponding time;
wherein the data points within the median window are sorted in increasing value;
wherein each mean output data point in the mean window is a mean value of data points within the mean window at a corresponding time;
wherein the mean window encompasses fewer data points than the median window; and
wherein the mean window begins at a predefined offset from the median window start point.

5. The method of claim 4, wherein the step of processing the valve current profile comprises generating a slope discriminator output according the relationship Output=median term times gain factor for median term minus (mean term times gain factor for mean term minus offset term), where Output is the slope discriminator output at a given time, median term is the median value of the sorted data points in the median window at the given time, mean term is the mean value of the data points in the mean window at the given time, and the gain factors are variable amplification factors, wherein
the gain factor for the median term is one plus the absolute value of the difference between the median value of the sorted data points in the median window at the given time and the mean value of the data points in the mean window at the given time; and
the gain factor for the mean term is one minus the absolute value of the difference between the median value of the sorted data points in the median window at the given time and the mean value of the data points in the mean window at the given time.

6. A method for controlling an injector, the method comprising:
instructing, using a controller, an injector to begin closing;
receiving, at the controller, an injector current profile of the injector;
processing, by the controller, the injector current profile using at least a slope discriminator;
determining, by the controller, based on an output of the slope discriminator: a stuck status of the injector; and a closing time of the injector when the injector is not stuck, by:
comparing the output of the slope discriminator to a predetermined closing time detection threshold;
determining whether a maximum output value of the slope discriminator is below the predetermined closing detection time detection threshold;
if the maximum output value is below the predetermined closing time detection threshold, determining that the stuck status is stuck; and
if the maximum output value is above the predetermined closing time detection threshold:
determining that the stuck status is not stuck, and
determining the closing time of the injector based on a location of the maximum output value.

7. The method of claim 6, further comprising providing the injector as a selective catalytic reduction injector.

* * * * *